United States Patent [19]

Ferro

[11] 4,324,383

[45] Apr. 13, 1982

[54] SEAT CENTERLINE OPERATED BUTTERFLY VALVE

[75] Inventor: Anthony J. Ferro, York, Pa.

[73] Assignee: Allis-Chalmers Corporation, Milwaukee, Wis.

[21] Appl. No.: 186,290

[22] Filed: Sep. 11, 1980

[51] Int. Cl.³ .............................................. F16K 1/22
[52] U.S. Cl. .................................... 251/308; 251/307
[58] Field of Search ................ 251/58, 228, 231, 252, 251/279, 305–308

[56] References Cited

U.S. PATENT DOCUMENTS

| | | | |
|---|---|---|---|
| 1,525,024 | 2/1925 | Carver | 251/228 X |
| 2,753,147 | 7/1956 | Welge | 251/305 X |
| 3,074,421 | 1/1963 | Borcherdt | 251/305 X |
| 3,260,496 | 7/1966 | Borcherdt | 251/307 X |
| 3,753,549 | 8/1973 | Rubright | 251/305 |
| 3,902,694 | 9/1975 | Friedell | 251/58 |
| 4,113,230 | 9/1978 | McCabe | 251/305 |
| 4,241,895 | 12/1980 | Sternenbey et al. | 251/306 |
| 4,266,570 | 5/1981 | Stieglitz | 137/613 |

FOREIGN PATENT DOCUMENTS 2127058  1/1972  Fed. Rep. of Germany ...... 251/305

Primary Examiner—A. Michael Chambers
Attorney, Agent, or Firm—Robert C. Jones

[57] ABSTRACT

The actuator shaft of a butterfly valve rotates 90 degrees to open or close an associated flow interrupter. As the shaft rotates its 90-degree motion is imparted to associated link members and the flow interrupters that are operably connected to the shaft. Thus, a drive link, secondary shaft and vane, as well as the support trunnions, are rotated simultaneously. This arrangement permits the seating of the seal on an axis which coincides with the axis of the actuator shaft and the sealing effected is bidirectional.

2 Claims, 3 Drawing Figures

SEAT CENTERLINE OPERATED BUTTERFLY VALVE

BACKGROUND OF THE INVENTION

In the past, butterfly valves have been constructed on the offset disc or vane principle. In this type of construction, the centerline of the seal seat mating surface is offset from the actuating shaft centerline. With this construction, 360 degrees of sealing could be effected without shaft interference. However, several problems are inherent with the offset seal construction. One is the longer face-to-face requirement. Another is that only unidirectional sealing can be effected.

SUMMARY OF THE INVENTION

The present invention is directed to changing the actuating shaft arrangement so that the sealing axis coincides with the axis of the actuating shaft. This arrangement provides for bidirectional sealing with no adverse affect on the face-to-face dimensional requirements.

According to this invention, the actuator shaft is constructed so as to rotate 90 degrees to move the flow interrupter (vane or disc) between open and closed positions. Linkage is provided through the valve body and is connected in a manner to move the interrupter simultaneously with the rotation of the actuating shaft and in the same angular amount. Pressure chambers are provided to house the actuating linkage external of the vane or valve body to prevent fluid leakage externally of the body and thus provide the sealing integrity required of valves. With the present arrangement, 360 degree seating in a plane in which the actuating shaft axis is located, can be effected to thereby permit unidirectional sealing.

DESCRIPTION OF THE INVENTION

Figure 1:
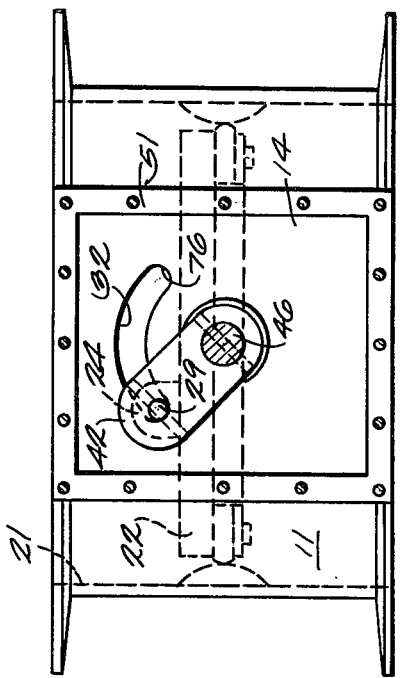
FIG. 1 is a plan view of the valve arrangement of the present invention.

Referring to FIG. 1 of the drawing illustrates one exemplary embodiment of the valve construction of this invention which is generally indicated by the reference numeral 10. The disclosed embodiment of the valve 10 is particularly well adapted to be used in relatively large retangular flumes or conduits wherein fluid or gas flow may be reversed at selective times. The valve 10 includes a valve body 11 of rectangular configuration having channel side walls 12 and 14 and relatively longer channel walls 16 and 17 respectively, presenting a front face 18 and a rear face 19 and defines a flow passageway 21. The valve 10 includes a valve flow interrupter herein shown as a rectangular vane 22 supported within the passageway 21 for rotational movement between open and closed position. To this end, the valve vane 22 is provided with laterally extending spaced apart lugs or abutments 23 and 24 reinforced for rigidity by means of gussets 26 and 27 respectively.

Figure 3:
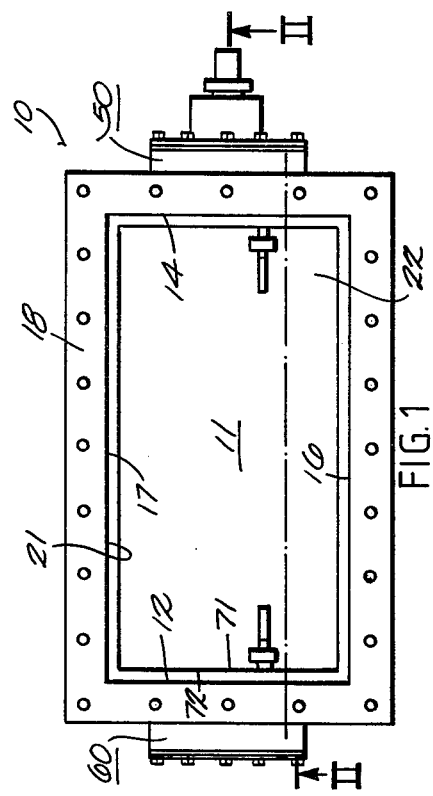
FIG. 3 is a view in right side elevation of the valve shown in FIG. 1, taken on line III—III of FIG. 2, with the pressure chamber cover removed to show the vane actuating linkage.

Extending outwardly from the lugs 23 and 24 are stub shafts 28 and 29. The stub shafts 28 and 29 are adapted to extend through identical arcuate slots 31 and 32, formed in the side walls 12 and 14 respectively. The arcuate slot 32 is best shown in FIG. 3. The free or outer ends of the stub shafts 28 and 29 are each secured in suitable openings formed in the ends of associated links 41 and 42. The link 41 has its opposite end secured to a stub supporting shaft 43 that is rotatably supported in a trunnion 44 welded to the outer surface of the side member 12. On the other hand, the link 42 is secured on a rotatable actuating shaft 46. The actuating shaft 46 has its inner end journalled in a bearing carried in a trunnion 47 that is welded to the outer surface of the side member 14.

Since the valve 10 is intended for service with either fluids or gases, the valve itself must be leakproof. To this end, the area wherein the link 42, shaft 29 and the arcuate slot 32 are located is formed as a compartment 50 to prevent leakage of fluid or gas through the arcuate slot 32 escaping to the atmosphere. To this purpose, a four-sided frame member 51 is welded to the extending leg portions of the side channel member 14. To seal the openings between the frame member 51 and the extending legs of the side channel member 14, skirt or extension pieces are welded between the legs of the side channel 14 and the frame member 51 as illustrated by the extension piece 52. A cover plate 53 is screw-fastened to the frame member 51 with a resilient seal 54 being imposed between the surface of the frame member and the cover plate. Thus, a sealed operating compartment is provided which insures a substantially leak-free valve.

The actuating shaft 46 extends outwardly through a suitable opening provided in the cover plate 53. The outer end of the shaft 46 is supported in a bushing 56 carried in a bearing carrier 57 welded to the outer surface of the cover plate 53. A packing gland 58 threaded into a counterbore formed in the shaft opening of the bearing carrier 57 operates to prevent leakage from the compartment 50.

A similar compartment 60 is provided on the opposite side of the valve to enclose the shaft 28, link 41 and stub shaft 43. The compartment 60 is similar in all respects to the compartment 50 except that the stub shaft 43 does not extend outwardly of the cover plate 61. Thus, the cover plate 61 is a simple flat piece, screw-fastened to the associated square frame member 62.

Operative sealing of the valve vane 22 when in a closed position is provided by means of a seat 71 which in cross section presents an arcuate configuration. The seat 71 extends completely around the inner surface of the frame and is located in a plane which includes the axis of the actuating shaft 46. A vane seal 72 of rectangular configuration is secured to one side face of the vane or disc 22 by means of retainer plate 73. With the vane 22 being offset with respect to the axis line of the actuating shaft 46, the vane seal 72 is located in the plane in which the axis of the actuating shaft 46 is located and coincides with the axis of the actuating shaft 46. With this arrangement, the vane is operable to seal against fluid flow in both directions.

Figure 2:
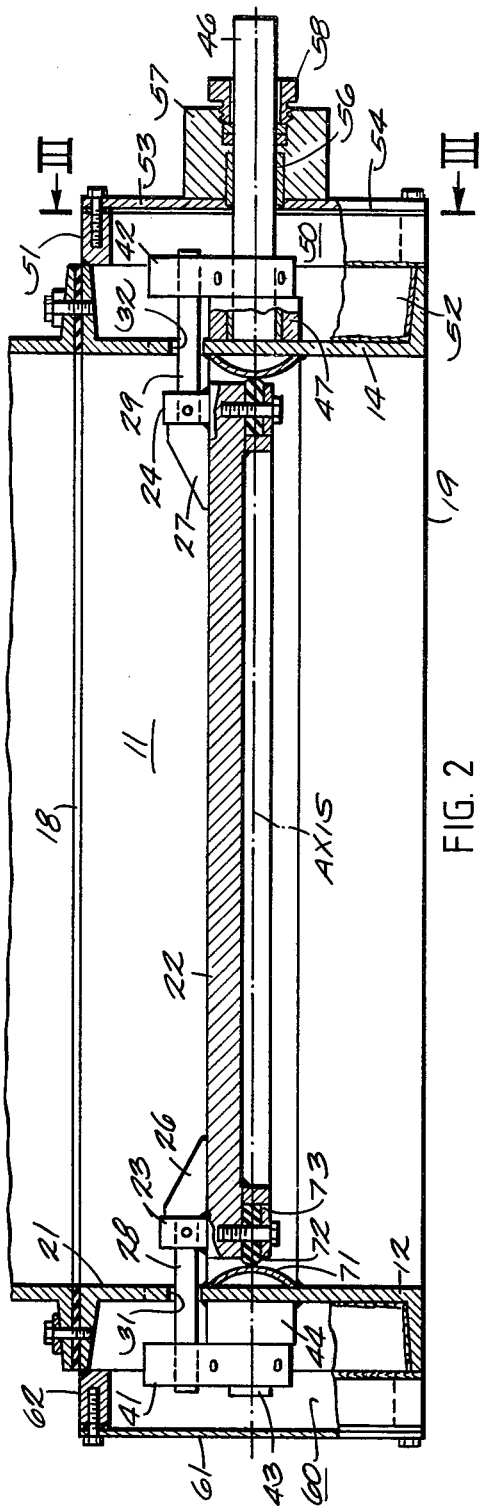
FIG. 2 is a view partly in section and partly in elevation taken in a plane represented by the lines II—II in FIG. 1, showing the flow interrupter arrangement and the associated drive.

In FIG. 2 the valve vane 22 is shown in a closed position where the flow passageway is blocked and fluid flow is interrupted. To effect an opening of the valve vane 22, the shaft 46 is rotated, either manually or by power, in a clockwise direction, as viewed in FIG. 3.

This action will cause the link 42 to rotate in a clockwise direction carrying the stub shaft 29 with it. The stub shaft 29, in being moved, travels in the arcuate groove 32 carrying the lug 24 with it. Since the lug 24 is welded to the vane disc 22, the vane will be forced to pivot with the lug and in the same direction. This movement will continue until the stub shaft 29 engages the end 76 of the slot 32 which serves as a positive stop. When the stub shaft 29 is in abutting engagement with the end 76 of the slot 32, the vane 22 will have been moved to a full open position, 90 degrees displaced from the position that is shown in FIGS. 2 and 3. Since the seat 71 and seal 72 are in the same plane in which the axis of the actuating shaft 46 is located, the pivotal movement of the vane 22 will cause the seal 72 to pivot in the seat center line.

From the foregoing it is apparent that an improved butterfly valve capable of sealing in either direction of fluid flow has been set forth. The valve frame is constructed of linear components which eliminates costly machine and complex casting forms.

While the valve of the present invention has been set forth and described as a rectangular valve, it will be appreciated that the configuration of the valve could be round if so desired.

The embodiments of the invention in which an exclusive property or privilege is claimed are defined as follows:

1. A butterfly valve including;
A valve body structure comprising four channel members operatively secured together and defining a passageway therethrough for fluid flow;
a valve vane supported by said valve body for pivotal movement within said passageway;
a valve seat within said passageway and secured to the inner surfaces of said channel members defining a continous seating surface and having a center line;
a seal carried by said vane at the outer edge thereof in position to engage with said seat on the center line thereof to provide bidirectional sealing;
drive means operably connected to effect pivotal movement of said vane to an open position or to a closed position selectively, said drive means having an actuating shaft, extending through and supported for rotation by said one of said channel members, said valve seat center line coinsides with the axis of said drive means;
a lever having one end secured to the inner end of said actuating shaft;
an arcuate slot formed in the wall of said channel member supporting said actuating shaft;
a secondary shaft carried by the opposite end of said lever and extending through said arcuate slot into said passageway;
an abutment secured to a surface of said vane and positioned to receive the end of said secondary shaft that extends into the passageway;
whereby rotation of said actuating shaft will effect the simultaneous movement of said connected lever, said secondary shaft, said abutment and, thereby, said vane; and
a compartment formed on the external surface of said channel member through which said drive means extends to enclose said drive means and said arcuate slot to prevent fluid leakage from the valve.

2. A butterfly valve including;
a valve body defining a passageway therethrough for fluid flow;
a valve vane supported by said valve body for pivotal movement within said passageway;
a valve seat secured to the inner surfaces of said valve body and defining a continuous seating surface and having a center line;
a seal carried by said vane at the outer edge thereof;
drive means operably connected to said vane to selectively effect pivotal movement of said vane to an open position or to a closed position in which said seal engages said seat on the center line thereof to provide bidirectional sealing;
said drive means comprising an actuating shaft, extending through and supported for rotation by said valve body, the axis of said actuating shaft coinsiding with said centerline of said valve seat;
a lever having one end secured to the inner end of said actuating shaft;
an arcuate slot formed in the wall of said valve adjacent to the support for said actuating shaft;
a secondary shaft carried by the opposite end of said lever and extending through said arcuate slot into said passageway;
an abutment secured to a surface of said vane and positioned to receive the end of said secondary shaft that extends into the passageway;
whereby rotation of said actuating shaft will effect the simultaneous movement of said connected lever, said secondary shaft, said abutment and, thereby, said vane; and
a compartment formed on that portion of the external surface of said valve body through which said actuator shaft extends to enclose said drive means and said arcuate slot to prevent fluid leakage from said valve.

* * * * *